United States Patent
Hagiwara et al.

(10) Patent No.: US 6,695,742 B2
(45) Date of Patent: Feb. 24, 2004

(54) CONTROL DEVICE FOR A CONTINUOUSLY VARIABLE TRANSMISSION

(75) Inventors: Yoshichika Hagiwara, Fuji (JP); Makoto Sawada, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/963,362

(22) Filed: Sep. 26, 2001

(65) Prior Publication Data

US 2002/0037788 A1 Mar. 28, 2002

(30) Foreign Application Priority Data

Sep. 26, 2000 (JP) ........................................ 2000-292772

(51) Int. Cl.[7] .............................................. B60K 41/12
(52) U.S. Cl. .............................. 477/46; 477/45; 477/48
(58) Field of Search ............................... 477/38, 43, 45, 477/46, 48, 54, 61

(56) References Cited

U.S. PATENT DOCUMENTS

| | | | | |
|---|---|---|---|---|
| 5,085,107 A | * | 2/1992 | Tatara | 474/12 |
| 5,257,960 A | * | 11/1993 | Sato | 474/28 |
| 5,417,621 A | | 5/1995 | Tibbles | 477/39 |
| 5,695,427 A | * | 12/1997 | Sato et al. | 477/43 |
| 5,697,866 A | | 12/1997 | Okahara | 477/169 |
| 5,700,224 A | * | 12/1997 | Suzuki et al. | 477/44 |
| 5,931,884 A | * | 8/1999 | Ochiai | 477/101 |
| 5,976,054 A | * | 11/1999 | Yasuoka | 477/109 |
| 6,007,452 A | * | 12/1999 | Sawada et al. | 474/12 |
| 6,013,006 A | * | 1/2000 | Ashizawa et al. | 477/46 |
| 6,063,004 A | * | 5/2000 | Ibamoto et al. | 477/40 |
| 6,181,020 B1 | * | 1/2001 | Uchida et al. | 290/40 A |
| 6,217,469 B1 | * | 4/2001 | Sawada et al. | 474/13 |
| 6,430,491 B1 | * | 8/2002 | Adachi et al. | 477/46 |

FOREIGN PATENT DOCUMENTS

| | | |
|---|---|---|
| DE | 198 06 760 A1 | 8/1998 |
| EP | 0 892 196 A2 | 1/1999 |
| EP | 0 893 627 A2 | 1/1999 |

* cited by examiner

*Primary Examiner*—Richard M. Lorence
*Assistant Examiner*—David D. Le
(74) *Attorney, Agent, or Firm*—Rossi & Associates (57) ABSTRACT

A CVT has a torque convener (T/C) speed ratio calculation section that determines the speed ratio from the engine speed and the primary pulley speed. The calculation section then calculates the torque ratio from the speed ratio. An input torque estimation section then estimates the input torque input into CVT from the torque ratio and the determined engine output torque. The T/C speed ratio calculation section, having a correction amount calculation section, reduces the speed ratio when the accelerator pedal is depressed to less than Np/Ne. Because the disparity with real value of the speed ratio occurring in the dead time of the respective revolution sensors can be decreased and the input torque properly estimated, slippage between the V belt and the variable pulley is prevented.

7 Claims, 11 Drawing Sheets

CONTROL DEVICE FOR A CONTINUOUSLY VARIABLE TRANSMISSION

BACKGROUND OF THE INVENTION

1. Field of the Invention

The present invention relates to a control device for a V belt type continuously variable transmission provided with a torque converter.

2. Description of the Prior Art

A V belt type of continuously variable transmission for a vehicle is known into which the output from the engine is input, via a torque converter and that continuously changes the transmission gear ratio using variable pulleys and a V belt.

In this type of continuously variable transmission, the target transmission gear ratio is calculated in accordance with the vehicle speed and throttle opening that are based on the depressing of the accelerator pedal by the driver, and the oil pressure to the variable pulleys is controlled such that the actual transmission gear ratio reaches the target transmission gear ratio.

More specifically, by controlling the oil pressure to the variable pulley on the drive side, the width of the contact between the V belt and the respective variable pulleys on the drive side and driven side is changed resulting in the gear changing being performed.

The contact friction force between the V belt and the variable pulleys is controlled in accordance with the line pressure. This line pressure is set so as to correspond to the input torque input into the continuously variable transmission. If the line pressure is excessively low relative to the input torque, then slippage takes place between the V belt and the variable pulleys. It the line pressure is excessively high, then the drive loss of the oil pump and the like increases.

Figure 8A:
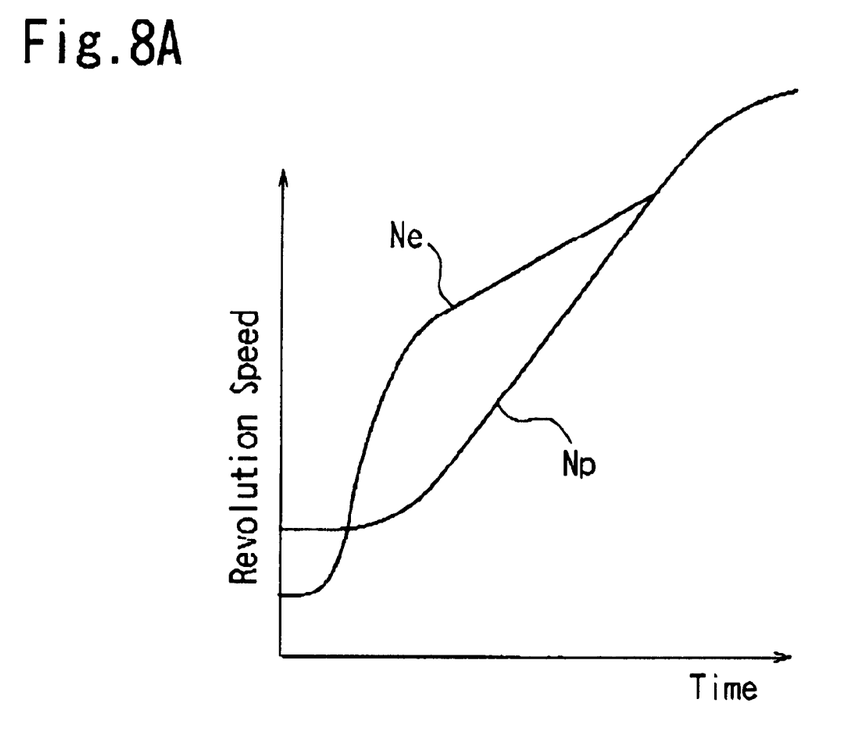
FIG. 8A is a graph showing the engine revolution speed Ne and the primary pulley revolution speed Np.
Figure 8B:
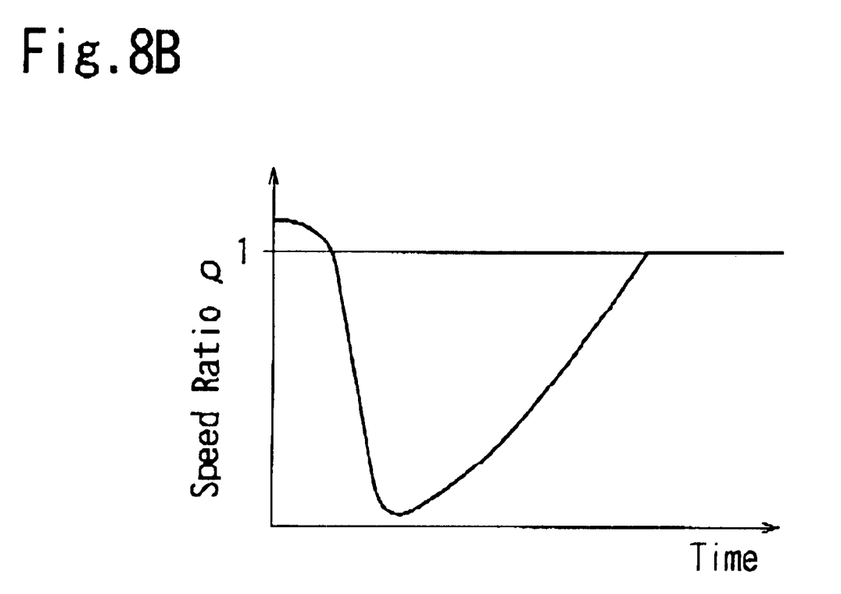
FIG. 8B is a graph showing the speed ratio ρ based on the speeds shown in FIG. 8A.

Here, because a torque converter is provided between the continuously variable transmission and the engine, it is not possible for the aforementioned input torque to be detected directly. Therefore, as is shown in FIG. 8A, firstly, the input revolution speed of the torque converter (=the revolution speed Ne of the engine) and the output revolution speed of the torque converter (=the revolution speed Np of the primary pulley) are measured. Next, as is shown in FIG. 8B, the speed ratio (output revolution speed/input revolution speed) ρ is determined. Next, the input torque that is input into the continuously variable transmission is estimated from the relationship between the torque ratio of the torque converter and the speed ratio such as that shown in FIG. 9 that is set in advance. The target line pressure is set and the line pressure is appropriately controlled so as to correspond to this estimated input torque.

SUMMARY OF THE INVENTION

Generally a large number of revolution speed sensors are provided of the type that detect the revolution speed from the time intervals between detections of teeth formed on the outer circumference of the revolving body and these are commonly used for the measurements of the input revolution speed Ne or the output revolution speed Np that form the foundation for determining the speed ratio of the torque converter.

However, the teeth pitches have become larger and the accuracy of the revolution sensor lowered due to the increasingly smaller and more integrated structure that have been the result of the progressively higher levels of required compactness for the torque converter and continuously variable transmission as a whole. As a result, the line pressure at the time when the accelerator pedal is depressed from a completely closed state is insufficient causing the belt to slip.

Figure 10A:
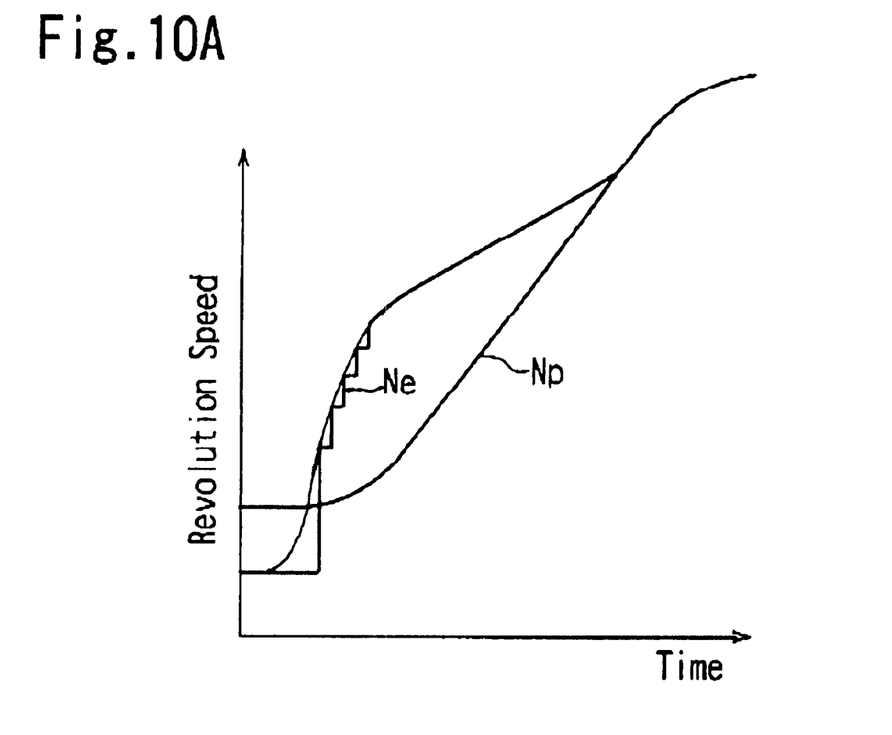
FIG. 10A is a graph showing the speeds detected by revolution speed sensors.
Figure 10B:
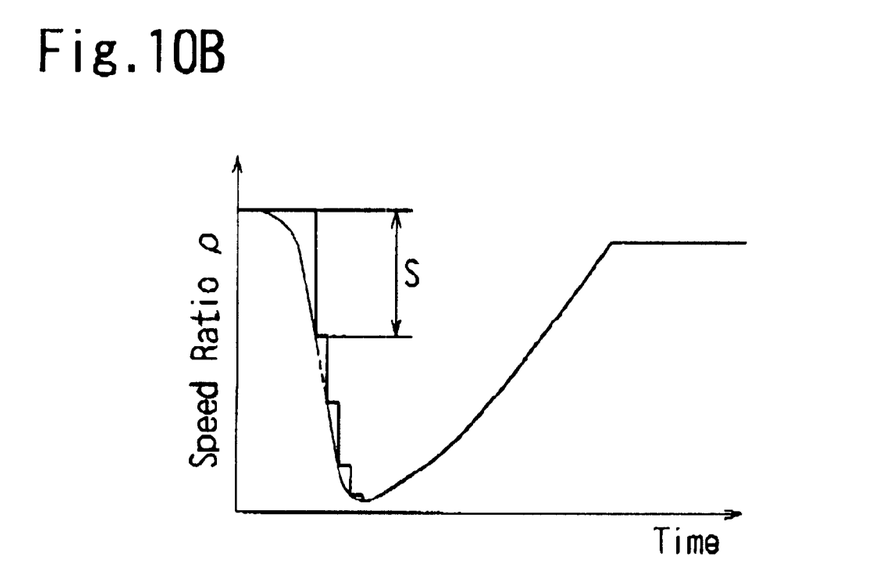
FIG. 10B is a graph showing the speed ratio ρ based on the speeds shown in FIG. 10A.

Namely, if the accuracy of the measurement of the output revolution speed and the input revolution speed is low as shown in FIG. 10A for example, than as is shown in FIG. 10B, the speed ratio ρ is calculated in a step configuration as is shown by the solid line in contrast to the actual values that are shown by the broken line with the width size of the first stop being 0.06 to 0.1 seconds and the size of the next step also being approximately 0.05 seconds. These width of the steps are the times the sensor is dead.

Figure 11:
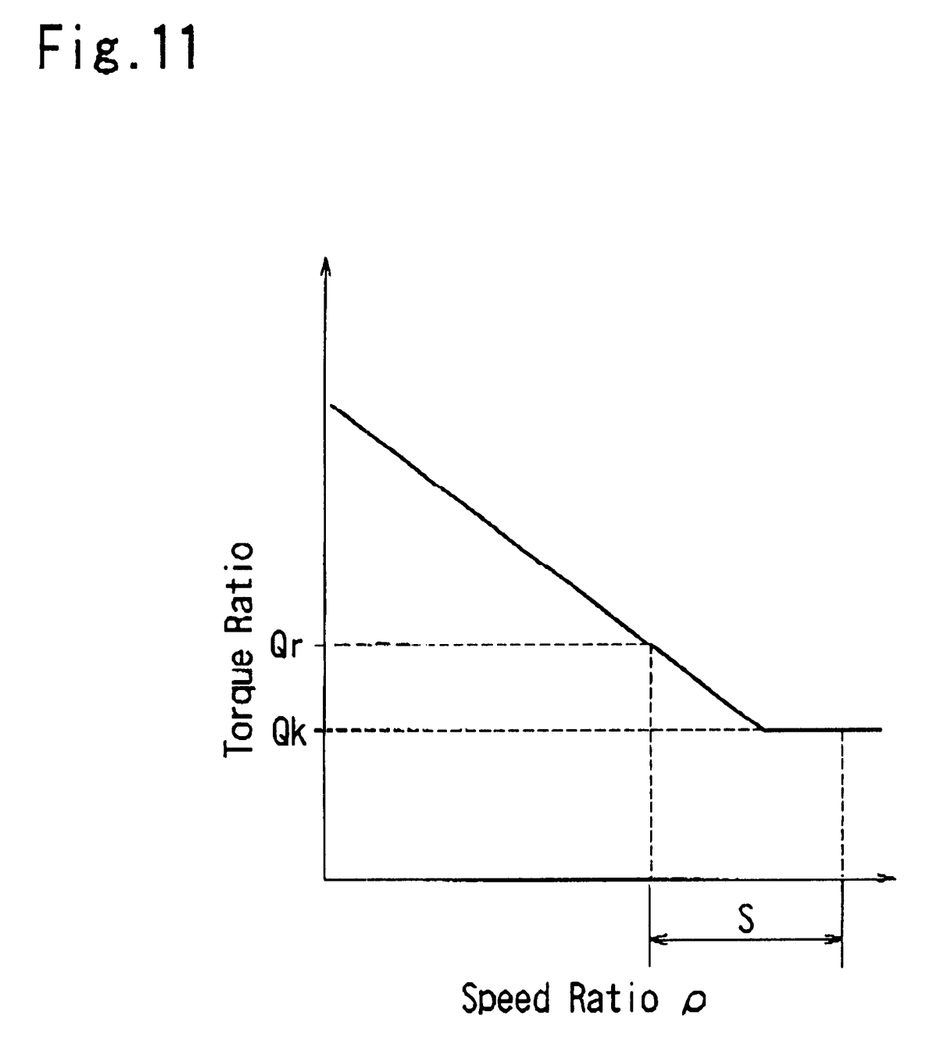
FIG. 11 is an explanatory view showing the drawbacks in a conventional example.

As a result, when the accelerator pedal is initially depressed, the speed ratio for the interval between each step is usually at a higher value than the actual value. Thus, as shown in FIG. 11, in spite of the fact that the actual value is Qr, the measured value Qk of the torque ratio of the torque converter is lower than Qr by the amount of the disparity between the measured values and the actual values, for example, S.

The speed ratio of the torque converter does recover to rise after temporarily dropping abruptly when the accelerator pedal is depressed from a completely closed state, however, the aforementioned disparity amount in the area where the torque converter speed ratio drops abruptly while the engine revolution speed is low directly after the accelerator is depressed is striking.

In this manner, because the torque ratio of the torque converter is determined to be low and the input torque that is input into the continuously variable transmission is estimated to be excessively small, the line pressure is insufficient under control performed to correspond to this input torque, thereby causing the belt to slip.

If a predetermined additional margin value is added to the calculated value Qk of the torque ratio in order to restrain this belt slippage, then the line pressure increases across the entire range causing the fuel consumption to deteriorate and also shortening the life of the belt due to the increased stress being applied to the belt.

Accordingly, in view of these drawbacks, it is an object of the present invention to provide a control device for a continuously variable transmission that accurately corrects the disparity between the measured values and the actual values of the torque ratio of a torque converter and performs the appropriate line pressure control even when the level of accuracy of the revolution speed sensor is low.

Therefore, the first aspect of the present invention is a control device for a V belt type continuously variable transmission for a vehicle, the transmission being connected to an engine via a torque converter, and provided with a variable pulley formed from a primary pulley and a secondary pulley and a V belt, in which a contact width of the V belt with the variable pulley is controlled by a transmission control section that controls oil pressure to the variable pulley so as to continuously change a transmission gear ratio between the primary pulley and the secondary pulley, wherein the transmission control section comprises: an engine torque calculation section for calculating output torque from the engine; an input side revolution speed sensor for detecting a revolution speed on an input side of the torque converter; an output side revolution speed sensor for detecting a revolution speed on an output side of the torque converter; a torque converter speed ratio calculation section for calculating a speed ratio between an input and an output of the torque converter based on the respective revolution speeds detected by the input side revolution speed sensor and the output side revolution speed sensor; a torque ratio calculation section for calculating from the torque converter speed ratio a torque ratio between an input and an output of the torque converter; an input torque estimation section for estimating from the torque ratio and the output torque from the engine an input torque input into the continuously variable transmission; and a line pressure setting section that sets oil pressure for the variable pulley based on the input torque estimated by the input torque estimation section, and wherein the torque converter speed ratio calculation section is provided with a correction amount calculation section for calculating a correction amount by which the input side revolution speed is to be increased in the initial stages of the depressing of the accelerator pedal relative to a simple ratio of the respective revolution speeds detected by the output side revolution speed sensor and the input side revolution speed sensor, and outputs the speed ratio in which the simple ratio has been corrected by the correction amount.

Because the correction is performed in the direction in which the input side revolution speed increases relative to the simple ratio of the respective detected revolution speeds of the output side and the input side of the torque converter, there is no delay relative to the actual change of the speed ratio. As a result, because the torque ratio is no longer determined to be the excessively low value, it is possible to make the optimum estimation of the input torque input into the continuously variable transmission. Also, since the correction to increase the input side revolution speed is made in the area of initial stage of the depressing of the accelerator pedal, the fuel consumption performance and durability are improved compared with when a margin value is added uniformly.

According to the second aspect of the present invention, the correction amount calculation section calculates a correction amount proportional to the inverse of the input side revolution speed, and the torque converter speed ratio calculation section sets as the speed ratio the ratio of the output side revolution speed to a value obtained by adding the correction amount to the input side revolution speed.

According to the third aspect of the present invention, the correction amount calculation section calculates the correction amount as a coefficient of the input side revolution speed, and the torque converter speed ratio calculation section adds the correction amount to the simple ratio of the input side revolution speed and the output side revolution speed and sets this as the speed ratio.

this time, while the input side revolution speed is lower than a predetermined value, the correction amount may be set at a negative fixed value, and when the input side revolution speed becomes greater than the predetermined value, the correction amount can be expressed by a straight line that increases at a predetermined gradient from the fixed value.

According to another aspect of the present invention, the correction amount calculation section calculates the correction amount as a coefficient of the output side revolution speed, and the torque converter speed ratio calculation section adds the correction amount to the simple ratio of the input side revolution speed and the output side revolution speed and sets this as the speed ratio.

BRIEF DESCRIPTION OF THE DRAWINGS

The nature of this invention, as well as other objects and advantages thereof, will be explained in the following with reference to the accompanying drawings, wherein.

DETAILED DESCRIPTION OF THE PREFERRED EMBODIMENTS

An embodiment of the present invention will now be described.

Figure 1:
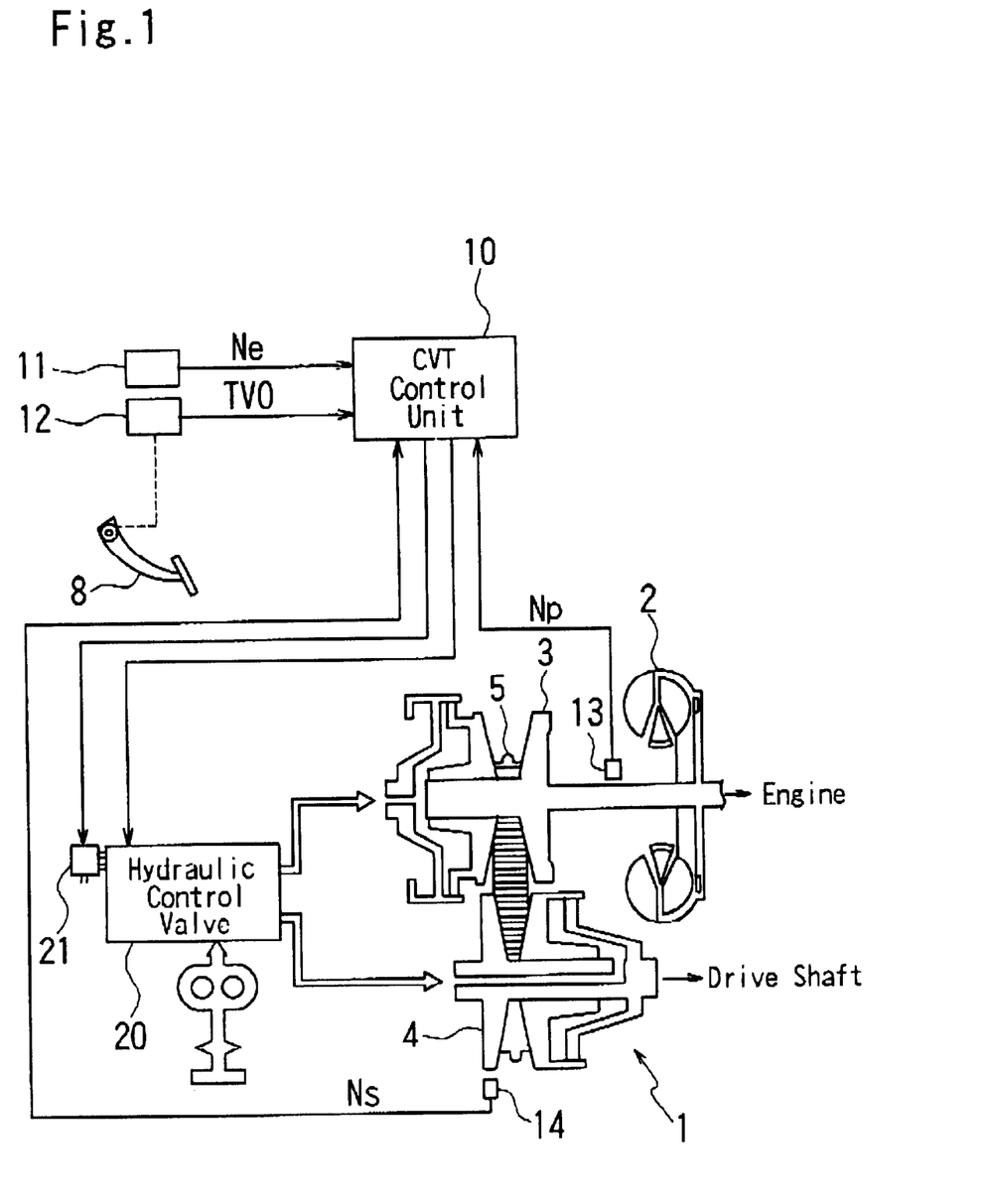
FIG. 1 is a schematic structural view of an embodiment of the present invention.

FIG. 1 is a schematic structural view of an embodiment of a V belt type continuously variable transmission.

The continuously variable transmission 1 is provided with a variable pulley comprising a primary pulley 3 connected via a torque converter 2 to an unillustrated engine and a secondary pulley 4 linked to a drive shaft. Both of these pulleys are linked by a V belt 5.

The speed ratio of the continuously variable transmission 1 is controlled by a hydraulic control valve 20 that is operated by instructions from a CVT control unit 10.

Namely, the CVT control unit 10 reads detected signals from a primary pulley revolution speed sensor 13 that detects the revolution speed Np of the primary pulley 3 of the continuously variable transmission 1 and signals from a secondary pulley revolution speed sensor 14 that detects the revolution speed Ns of the secondary pulley 4 of the continuously variable transmission 1. The CVT control unit also reads the throttle valve opening angle TVO (referred to below simply as "throttle opening") from an engine throttle sensor 12 and the engine revolution speed Ne from an engine revolution speed sensor 11 and seconds transmission gear ratio instructions to the hydraulic control valve 20 in accordance with the running state of the vehicle. Note that the throttle valve opens and closes based on the amount the accelerator pedal 8 is depressed.

The line pressure which forms the basis of the contact friction force of the V belt 5 is controlled from the CVT control unit 10 via a line pressure solenoid 21.

The revolution speed Ne of the engine is the revolution speed on the input side of the torque converter 2. The engine revolution speed sensor 11 forms the input side revolution speed sensor. Moreover, the revolution speed Np of the primary pulley 3 is the revolution speed on the output side of the torque converter 2 and the primary pulley revolution speed sensor 13 is the output side revolution speeds sensor.

Figure 2:
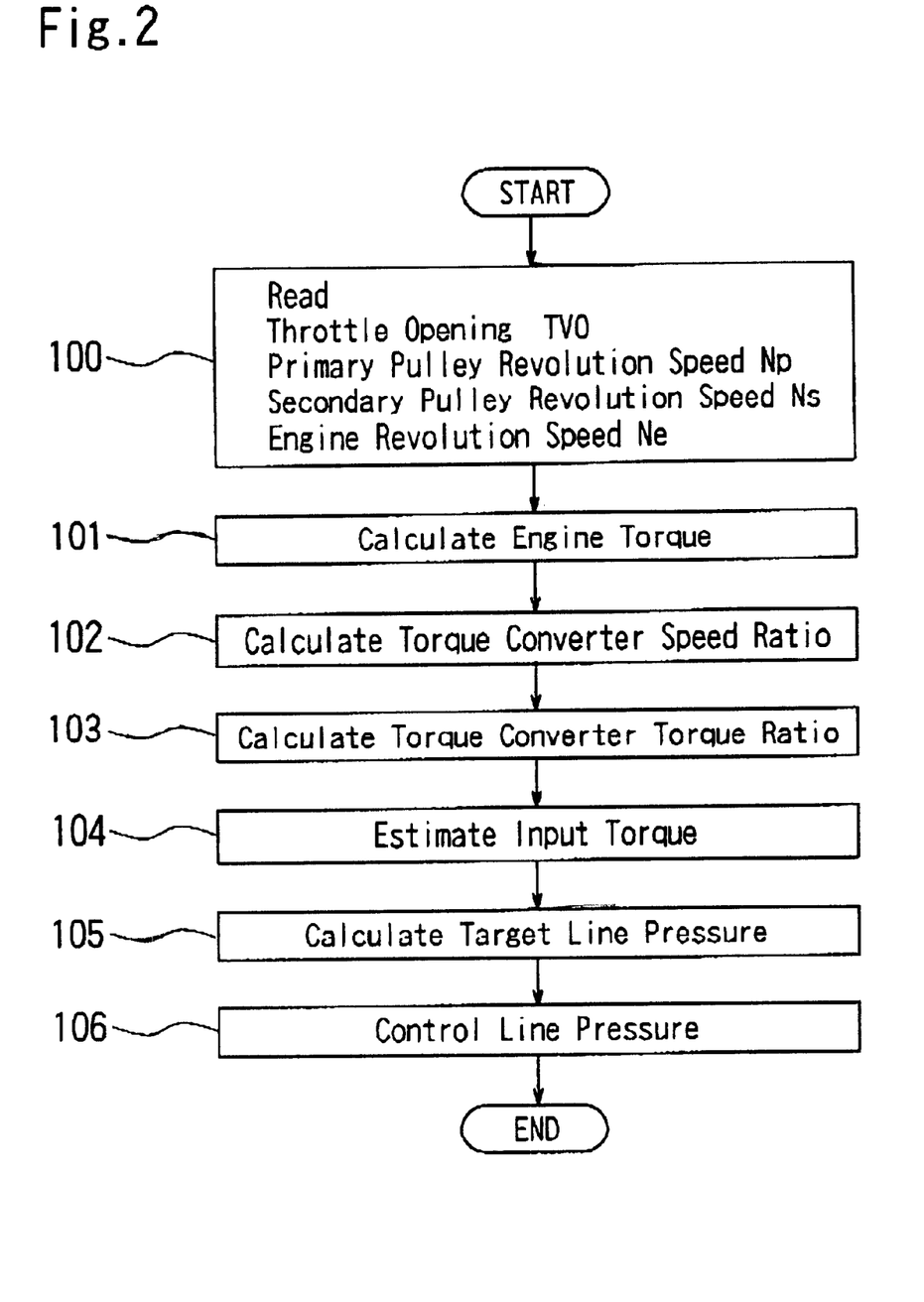
FIG. 2 is a flowchart showing the flow of the continuously variable transmission line pressure control.

FIG. 2 is a flow chart showing the line pressure control for the continuously variable transmission 1 by the CVT control unit 10.

Firstly, at stop 100, the throttle opening TVO, the engine revolution speed Ne, the primary pulley revolution speed Np, and the secondary pulley revolution speed Ns are read.

At step 101, the engine torque is determined from a map set in advance based on the throttle opening TVO and the engine revolution speed Ne. On this map the output torque is set in accordance with the engine revolution speed Ne taking the throttle opening TVO, for example, as a parameter.

At step 102, the speed ratio between the input and output of the torque converter 2 (referred to below as the torque converter speed ratio) is calculated on the basis or the primary pulley revolution speed Np and the engine revolution speed Ne.

Thereafter, at step 103, the torque ratio of the torque converter 2 is determined based on a map (see FIG. 9) set in advance and on the torque converter speed ratio.

At step 104, the input torque input into the continuously variale transmission 1 is estimated from the above torque ratio and the engine torque calculated at the earlier step 101.

At step 105, a target line pressure is determined so as to give an optimum value for the contact friction force between the V belt 5 and the primary pulley 3 and secondary pulley 4. This target line pressure is obtained from a map in accordance with the current transmission gear ratio taking the input torque as a parameter. Note that the transmission gear ratio is given by dividing the primary pulley revolution speed Np by the secondary pulley revolution speed Ns.

At step 106, the line pressure solenoid 21 is operated based on the target line pressure determined in the manner described above so as to control the line pressure.

Figure 3:
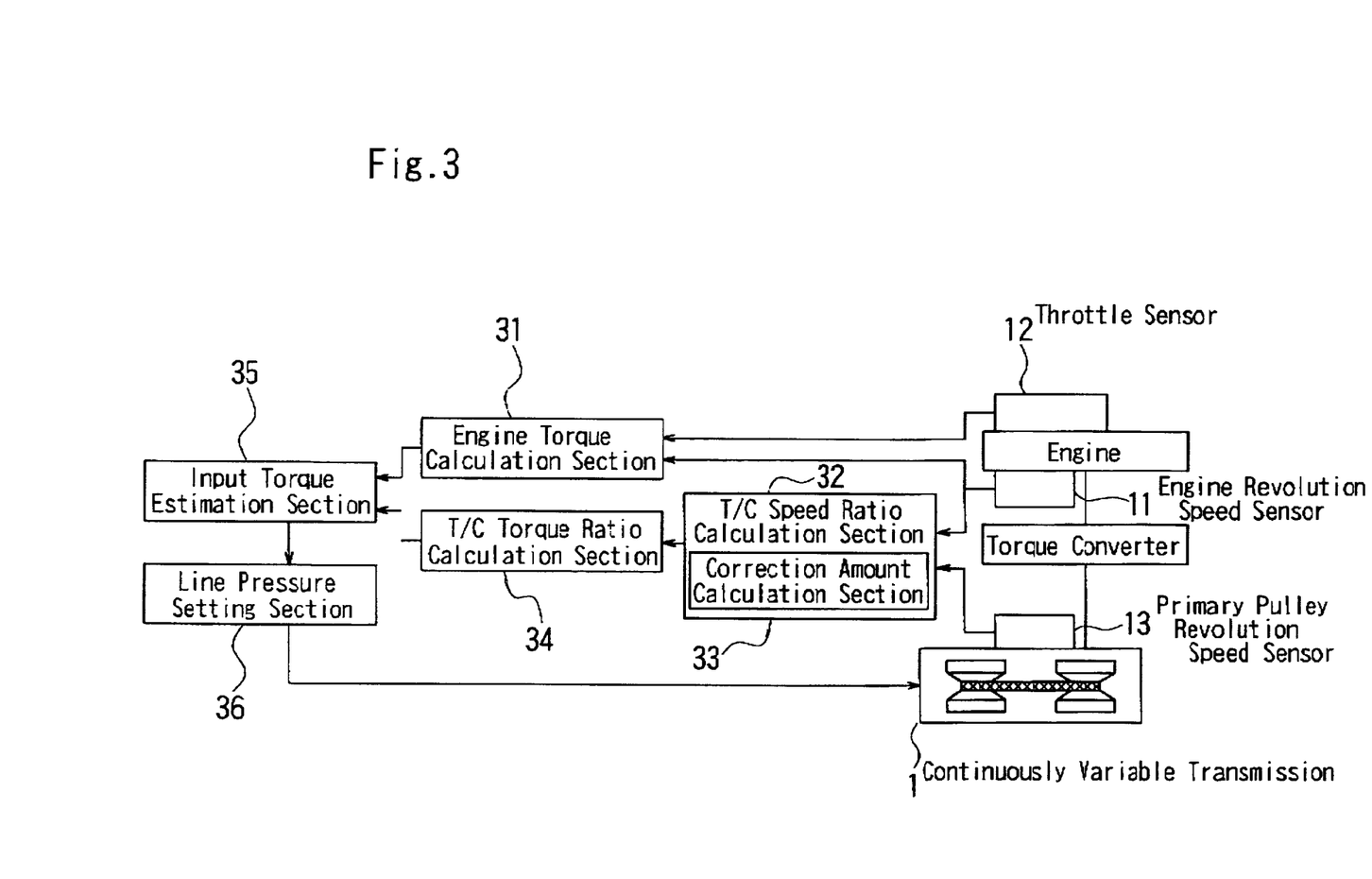
FIG. 3 is a control block diagram of the continuously variable transmission line pressure control.

The aforementioned control is expressed as a control block diagram such as that in FIG. 3.

The engine torque calculation section 31 corresponds to the step 101 in the flow chart. The torque converter (T/C) speed ratio calculation section 32 corresponds to the step 102.

The torque converter (T/C) torque ratio calculation section 34 connected to the torque converter speed ratio calculation section 32 corresponds to the step 103, while the input torque estimation section 35 to which the engine torque calculation section 31 and the torque converter torque ratio calculation section 34 are connected corresponds to the step 104. The line pressure setting section 36 connected to the input torque estimation section 35 corresponds to the step 105.

The torque converter speed ratio calculation section 32 that corresponds to the step 102 is provided internally with a correction amount calculation section 33 and reads the revolution speed Ne of the engine from the engine number of revolution sensor 11 and the revolution speed Np of the primary pulley from the primary pulley revolution speed sensor 13. Subsequently, firstly, the correction amount is calculated in the correction amount calculation section 33 according to the formula below using the engine revolution speed Ne.

$$G=a/Ne.$$

Figure 4A:
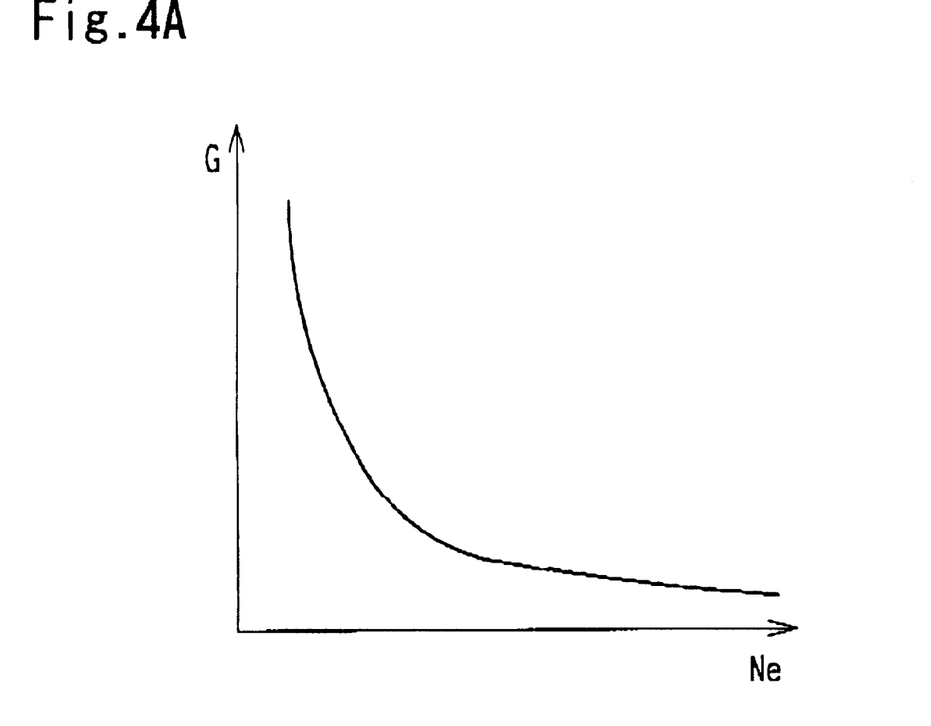
FIG. 4A is a map showing the correction amount used in the torque converter speed ratio calculation.

As is shown in FIG. 4A, which is a diagram of the relationship between this correction amount and the engine revolution speed, the value of the correction amount G becomes larger the lower the engine revolution speed Ne when the accelerator pedal is being depressed and, although not specially illustrated, is expressed as a plurality of line diagrams that have the throttle opening TVO as a parameter.

Figure 4B:
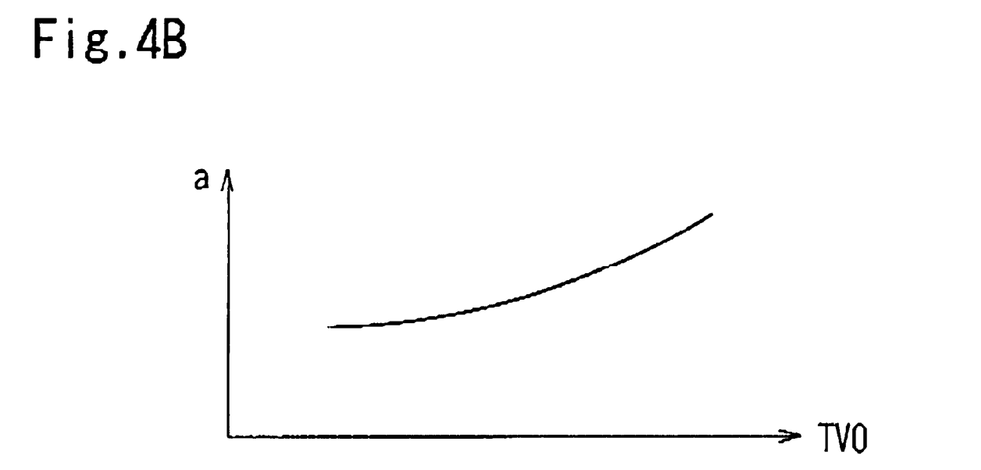
FIG. 4B is a map showing the correction coefficient.

Note that "a" is a correction coefficient and, as is shown in the map in FIG. 4B, is set such that the value thereof becomes higher the larger the throttle opening TVO.

The torque converter speed ratio calculation on adds the correction amount G to the engine revolution speed Me and calculates the torque converter speed ratio ρ using the following formula.

$$\rho = Np/(Ne+G) \qquad (1)$$

The present embodiment is structured as has been described above and, when the torque converter speed ratio is being calculated, by adding the correction item of G (=a/Ne) to the engine revolution speed side and then performing the calculation, it is possible to obtain not the simple ratio to the engine revolution speed Ne and the primary pulley revolution speed Np that are based on the detections of the corresponding revolution number sensors 11 and 13, but to obtain the speed ratio which is a lower value than the simple ratio Np/Ne, particularly when the accelerator pedal 8 is initially depressed.

Figure 9:
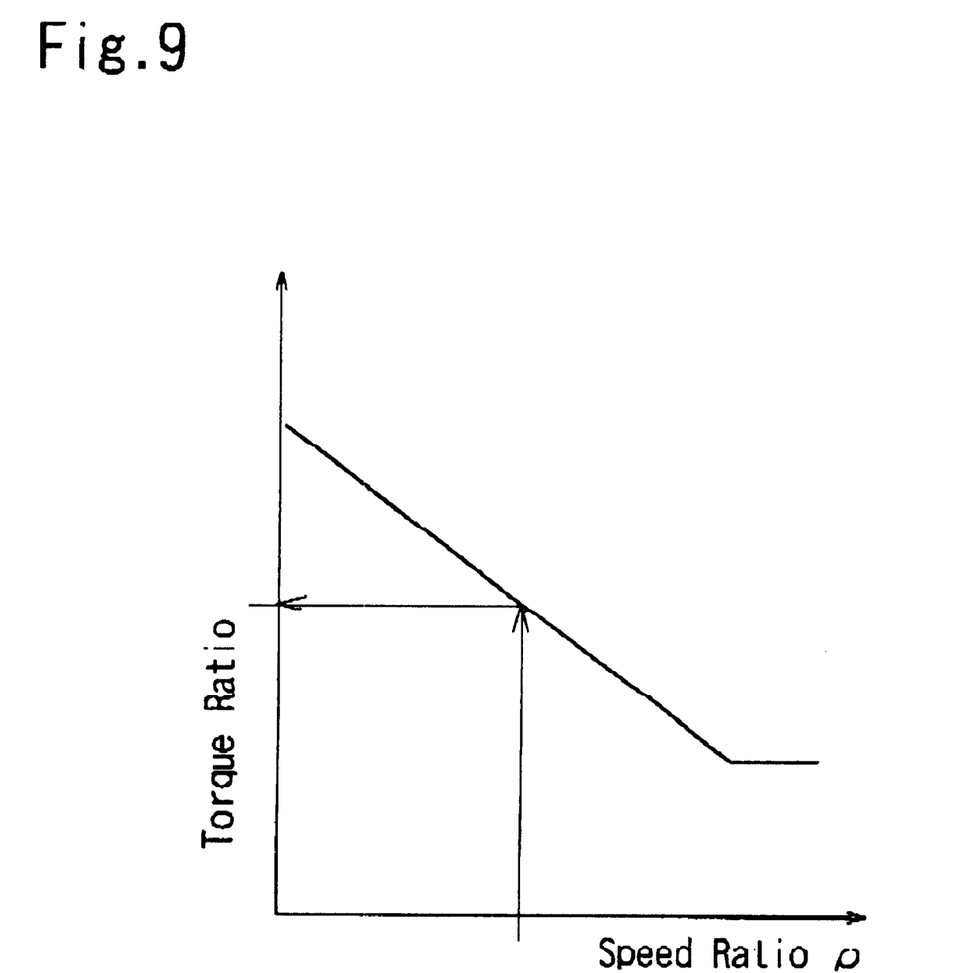
FIG. 9 is a graph showing the relationship between the torque converter speed ratio and the torque ratio.

As a result, because a high torque ratio is obtained on the torque ratio line diagram shown in FIG. 9 and it is possible to make the optimum estimation of the input torque input into the continuously variable transmission 1, no slippage is generated between the v belt 5 and the variable pulley 5 because of excessively small line pressure.

Moreover, after the initial stage of depressing the accelerator pedal 8 when the revolution speeds (Ne, Np) between the input and output of the torque converter 2 approach each other to reach a stationary state, because the value of the correction item is decreased so that essentially the ratio comes close to a simple ratio, the amount of the increase in the line pressure due to the correction also reaches a level that can be ignored and the fuel consumption performance and durability are improved compared with when a margin value is added uniformly.

Next, a description will be given of a variant example of the calculation of the torque converter speed ratio ρ by the torque converter speed ratio calculation section 32. In this example, the correction amount is provided by linear approximation relative to the simple ratio of the engine revolution speed Ne and the primary pulley revolution speed Np.

Figure 5:
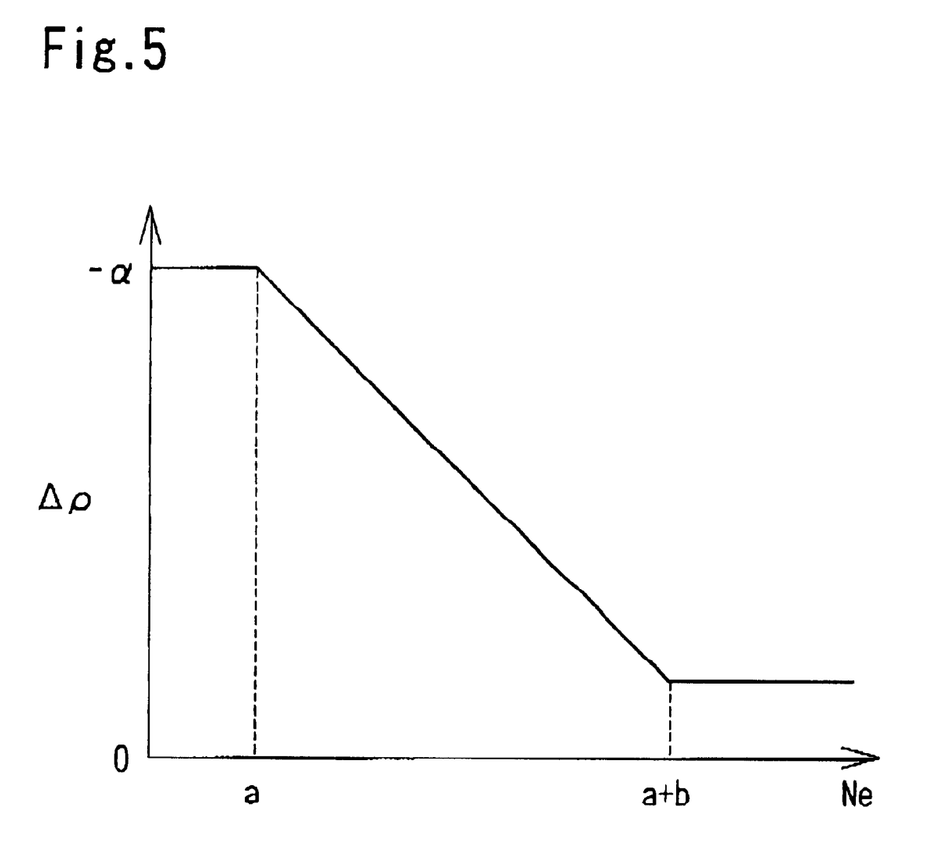
FIG. 5 is a map showing the correction amount in a variant example of the torque converter speed ratio calculation.

Here, as is shown in FIG. 5, relative to the simple ratio Np/Ne, the starting correction amount while the engine revolution speed is low when the accelerator pedal is initially depressed is set to (−) α, and the correction amount Δρ becomes gradually smaller in the direction of 0 correspondingly to the increase in the engine revolution speed Ne. Here, "a" is the revolution speed of the engine at the point when the correction amount starts to change, and (a|b) is the engine speed at the point when the correction amount stops changing.

The torque converter speed ratio of this variant example is expressed as is shown below;

$$\rho = (Np/Ne) + \text{Min} \{\text{Max} [c(Ne-a)/b, 0], c\} a/Ne - \alpha \qquad (2)$$

wherein "c" is the minimum value of the correction amount.

Figure 6:
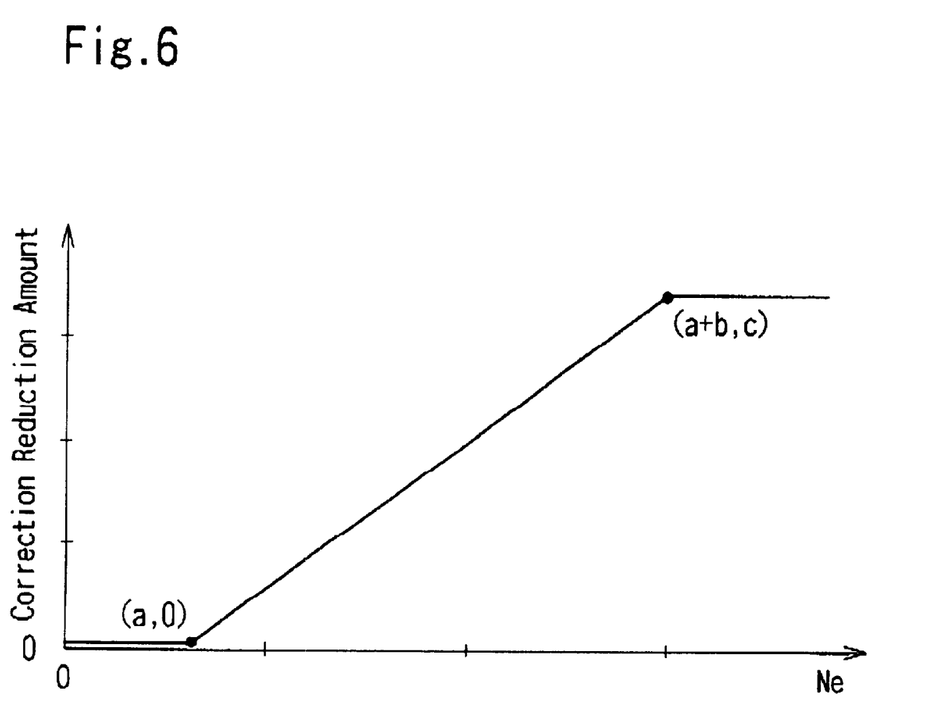
FIG. 6 is a map showing the correction reduction amount for the correction amount calculation.

The second item in Formula (2) represents the amount of the correction reduction from the start correction amount and is shown by the bent line in FIG. 6. Because the values of "a", "b", "c", and "α" change depending on the throttle opening TVO, although not specially illustrated, the correction items from the second item and below are expressed as a plurality of line diagrams that have the throttle opening TVO as a parameter.

As a result, until the engine revolution speed Ne reaches the value "a", the correction reduction amount is 0 and the total correction amount for the simple ratio Np/Ne is (−α). While the engine revolution speed Ne is between "a" and (a+b), the correction reduction amount increases at the gradient c/b and the total correction amount becomes smaller. Then, when the engine revolution speed Ne is at the point (a+b), the correction reduction amount reaches "c". Thereafter, the total correction amount is held at (−(α−c)).

As a result of this as well, by means of a simple formula, a torque converter speed ratio that is close to the actual value when the accelerator pedal 8 is initially depressed is obtained and it is possible to make the optimum estimation of the input torque input into the continuously variable transmission 1.

A further description will now be given of yet another variant example of the calculation of the torque converter speed ratio ρ.

In this example, the amount of the disparity in the torque converter speed ratio is determined in advance in accordance with the changes in the primary pulley revolution speed Np when the accelerator pedal 8 is initially depressed and this disparity amount is taken as the correction amount.

Figure 7:
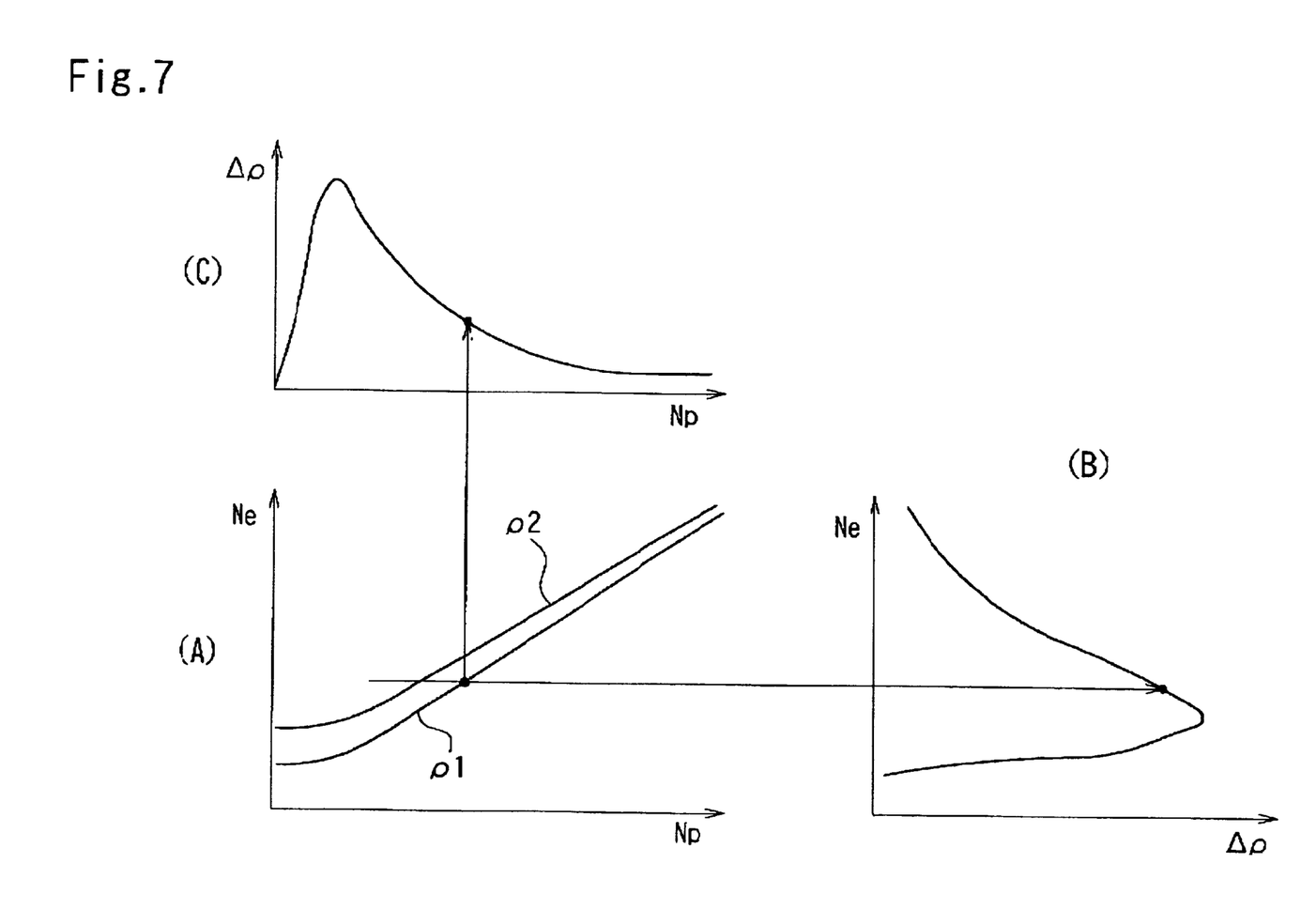
FIG. 7 is an explanatory view showing the correction amount calculation capacity in another variant example.

FIG. 7 shows the concept behind this.

In FIG. 7, the graph (A) shows the ratio ρ1 of the primary pulley revolution speed Np and the engine revolution speed Ne when the accelerator pedal has been released and the vehicle is coasting stably, together with the speed ratio ρ2 after the engine revolution speed Ne has risen during the sensor dead time when the accelerator pedal 8 is depressed from a fully closed state.

The difference between ρ1 and ρ2 is the disparity in the torque converter speed ratio generated in the sensor dead time.

The graph (B) in FIG. 7 shows the result when the difference between ρ1 and ρ2 is projected onto the engine revolution speed Ne axis when the accelerator pedal 8 is initially depressed. This characteristic conforms to FIG. 10 showing a large disparity being generated in the torque converter speed ratio during the initial depression of the accelerator 8.

The graph (C) in FIG. 7 shows the result when the difference between ρ1 and ρ2 shown in the graph (A) is projected onto the primary pulley revolution speed Np axis and is essentially the same as the disparity in the torque converter speed ratio represented in the graph (B). Although not specially illustrated, the amount of this disparity Δρ (=|ρ1−ρ2|) is expressed as a plurality of line diagrams with the throttle opening TVO as a parameter.

Accordingly, in this variant example, the amount of the disparity Δρ of the primary pulley revolution speed Np base is read based on the map shown in the graph (C) and, using this as the correction amount, the torque converter speed ratio ρ is calculated using the following formula.

$$\rho = (Np/Ne) - \Delta\rho \quad \Delta\rho = f(Ne, TVO) \qquad (3)$$

As a result of this as well, the disparity of a torque converter speed ratio caused by the sensor dead time when the accelerator pedal 8 is initially depressed is corrected and it is possible to make the optimum estimation of the input torque input into the continuously variable transmission 1 by use of this corrected speed ratio.

Note that, in the present embodiment, in order to determine the torque converter speed ratio, the engine revolution speed Ne is read as the input side revolution speed directly from the engine revolution speed sensor 11, however, the present invention is also applicable in its current form to the case in which the engine revolution speed is input, for example, via an engine control unit for controlling the engine.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A control device for a V belt type continuously variable transmission for a vehicle, the transmission being connected to an engine via a torque converter, and provided with a variable pulley formed from a primary pulley and a secondary pulley and a V belt, in which a contact width of the V belt with the variable pulley is controlled by a transmission control section that controls oil pressure to the variable pulley so as to continuously change a transmission gear ratio between the primary pulley and the secondary pulley, the transmission control section comprising:

an engine torque calculation section for calculating output torque from the engine;

an input side revolution speed sensor for detecting a revolution speed on an input side of the torque converter;

an output side revolution speed sensor for detecting a revolution speed on an output side of the torque converter;

a torque converter speed ratio calculation section for calculating a speed ratio between said input and said output of the torque converter based on the respective revolution speeds detected by the input side revolution speed sensor and the output side revolution speed sensor;

a torque ratio calculation for calculating from torque converter speed ratio a torque ratio between said input and said output of the torque converter;

an input torque estimation section for estimating from the torque ratio and the output torque from the engine an input torque input into the continuously variable transmission; and a line pressure setting section that set oil pressure for the variable pulley based on the input torque estimated by the input torque estimation section, wherein the torque converter speed ratio calculation section is provided with a correction amount calculation section for calculating a correction amount by which the input side revolution speed is to be increased in the initial stages of the depressing of the accelerator pedal relative to a ratio of the respective revolution speeds detected by the output side revolution speed sensor and the input side revolution speed sensor, and outputs the speed ratio in which the ratio has been corrected by the correction amount.

2. The control device for a continuously variable transmission according to claim 1, wherein the correction amount calculation section calculates the correction amount as a coefficient of the input side revolution speed, and the torque converter speed ratio calculation section adds the correction amount to the ratio of the input side revolution speed and the output side revolution speed and sets the sum as the speed ratio.

3. The control device for a continuously variable transmission according to claim 1, wherein the correction amount calculation section calculates the correction amount as a coefficient of the output side revolution speed, and the torque converter speed ratio calculation section adds the correction amount to the simple ratio of the input side revolution speed and the output side revolution speed and sets this as the speed ratio.

4. The control device for a continuously variable transmission according to claim 1, wherein the correction amount calculation section calculates a correction amount which increases as the output torque from the engine estimated by said engine torque calculation section increases.

5. A control device for a V belt type continuously variable transmission for a vehicle, the transmission being connected to an engine via a torque converter, and provided with a variable pulley formed from a primary pulley and a secondary pulley and a V belt, in which a contact width of the V belt with the variable pulley is controlled by a transmission control section that controls oil pressure to the variable pulley so as to continuously change a transmission gear ratio between the primary pulley and the secondary pulley, the transmission control section comprising:

an engine torque calculation section for calculating output torque from the engine;

an input side revolution speed sensor for detecting a revolution speed on an input side of the torque converter;

an output side revolution speed sensor for detecting a revolution speed on an output side of the torque converter;

a torque converter speed ratio calculation section for calculating a speed ratio between an input and an output of the torque converter based on the respective revolution speeds detected by the input side revolution speed sensor and the output side revolution speed sensor;

a torque ratio calculation section for calculating from torque converter speed ratio a torque ratio between an input and an output of the torque converter;

an input torque estimation section for estimating from the torque ratio and the output torque from the engine an input torque input into the continuously variable transmission; and a line pressure selling section that set oil pressure for the variable pulley based on the input torque estimated by the input torque estimation section, wherein the torque converter speed ratio calculation section is provided with a correction amount calculation section for calculating a correction amount by which the input side revolution speed is to be increased in the initial stages of the depressing of the accelerator pedal relative to a ratio of the respective revolution speeds detected by the output side revolution speed sensor and the input side revolution speed sensor, and outputs the speed ratio in which the ratio has been corrected by the correction amount, wherein the correction amount calculation section calculates a correction amount proportional to the inverse of the input side revolution speed, and the torque converter speed ratio calculation section sets as the speed ratio the ratio of the outside revolution speed to a value obtained by adding the correction amount to the input side revolution speed.

6. A control device for a V belt type continuously variable transmission for a vehicle, the transmission being connected to an engine via a torque converter, and provided with a variable pulley formed from a primary pulley and a secondary pulley and a V belt, in which a contact width of the V belt with the variable pulley is controlled by a transmission control section that controls oil pressure to the variable pulley so as to continuously change a transmission gear ratio between the primary pulley and the secondary pulley, the transmission control section comprising:

an engine torque calculation section for calculating output torque from the engine;

an input side revolution speed sensor for detecting a revolution speed on an input side of the torque converter;

an output side revolution speed sensor for detecting a revolution speed on an output side of the torque converter;

a torque converter speed ratio calculation section for calculating a speed ratio between an input and an output of the torque converter based on the respective revolution speeds detected by the input side revolution speed sensor and the output side revolution speed sensor;

a torque ratio calculation section for calculating from torque converter speed ratio a torque ratio between an input and an output of the torque converter;

an input torque estimation section for estimating from the torque ratio and the output torque from the engine an input torque input into the continuously variable transmission; and a line pressure setting section that set oil pressure for the variable pulley based on the input torque estimated by the input torque estimation section, wherein the torque converter speed ratio calculation section is provided with a correction amount calculation section for calculating a correction amount by which the input side revolution speed is to be increased in the initial stages of the depressing of the accelerator pedal relative to a ratio of the respective revolution speeds detected by the output side revolution speed sensor and the input side revolution speed sensor, and outputs the speed ratio in which the ratio has been corrected by the correction amount, wherein the correction amount calculation section calculates the correction amount as a coefficient of the input side revolution speed, and the torque converter speed ratio calculation section adds the correction amount to the ratio of the input side revolution speed and the output side revolution speed and sets the sum as the speed ratio, and wherein while the input side revolution speed is lower than a predetermined value, the correction amount is set at a negative fixed value and when the input side revolution speed becomes greater than the predetermined value, the correction amount is expressed by a straight line that increases at a predetermined gradient from the fixed value.

7. A control device for a V belt type continuously variable transmission for a vehicle, the transmission being connected to an engine via a torque converter, and provided with a variable pulley formed from a primary pulley and a secondary pulley and a V belt, in which a contact width of the V belt with the variable pulley is controlled by a transmission control section that controls oil pressure to the variable pulley so as to continuously change a transmission gear ratio between the primary pulley and the secondary pulley, the transmission control section comprising:

an engine torque calculation means for calculating output torque from the engine;

an input side revolution speed detecting means for detecting a revolution speed on an input side of the torque converter;

an output side revolution speed detecting means for detecting a revolution speed on an output side of the torque converter;

a torque converter speed ratio calculation means for calculating a speed ratio between an input and an output of the torque converter based on the respective revolution speeds detected by the input side revolution speed detecting means and the output side revolution speed detecting means;

a torque ratio calculation means for calculating from torque converter speed ratio a torque ratio between an input and an output of the torque converter;

an input torque estimation means for estimating from the torque ratio and the output torque from the engine an input torque input into the continuously variable transmission; and     a line pressure setting means for setting oil pressure for the variable pulley based on the input torque estimated by the input torque estimation means,     wherein the torque converter speed ratio calculation means is provided with a correction amount calculation means for calculating a correction amount by which the input side revolution speed is to be increased in the initial stages of the depressing of the accelerator pedal relative to a ratio of the respective revolution speeds detected by the output side revolution speed detecting means and the input side revolution speed detecting means, and outputs the speed ratio in which the ratio has been corrected by the correction amount.

* * * * *